US006997057B2

(12) United States Patent
Noël

(10) Patent No.: US 6,997,057 B2
(45) Date of Patent: Feb. 14, 2006

(54) SOUND POLLUTION SURVEILLANCE SYSTEM AND METHOD

(75) Inventor: René Noël, Val Joll (CA)

(73) Assignee: Seti Media Inc., Sherbrooke (CA)

( * ) Notice: Subject to any disclaimer, the term of this patent is extended or adjusted under 35 U.S.C. 154(b) by 0 days.

(21) Appl. No.: 10/485,264

(22) PCT Filed: Aug. 7, 2002

(86) PCT No.: PCT/CA02/01228

§ 371 (c)(1),
(2), (4) Date: Feb. 10, 2004

(87) PCT Pub. No.: WO03/015456

PCT Pub. Date: Feb. 20, 2003

(65) Prior Publication Data
US 2004/0194549 A1 Oct. 7, 2004

Related U.S. Application Data

(60) Provisional application No. 60/367,267, filed on Mar. 26, 2002.

(30) Foreign Application Priority Data
Aug. 10, 2001 (CA) .................................. 2357060

(51) Int. Cl.
G08B 21/00 (2006.01)
(52) U.S. Cl. .................. 73/647; 181/141; 340/937
(58) Field of Classification Search ............... 73/647, 73/587, 489, 649, 432.1; 340/943
See application file for complete search history.

(56) References Cited

U.S. PATENT DOCUMENTS

| 3,573,724 A | 4/1971 | Komorida ................... 340/934 |
| 3,661,224 A | 5/1972 | Allen et al. ................... 73/647 |
| 3,844,175 A | 10/1974 | Hixson ........................ 73/647 |
| 3,848,471 A * | 11/1974 | Hamburg et al. ............. 73/647 |
| 4,257,273 A | 3/1981 | Knowd ........................ 73/647 |
| 4,287,771 A * | 9/1981 | Dugot ......................... 73/647 |
| 4,626,580 A | 12/1986 | Feast et al. ................. 526/253 |
| 4,920,340 A | 4/1990 | Mizuno ..................... 340/905 |
| 5,099,456 A | 3/1992 | Wells ........................ 367/127 |
| 5,436,612 A | 7/1995 | Aduddell .................... 340/438 |
| 5,796,847 A | 8/1998 | Kalhotsu et al. ............. 381/57 |
| 5,798,983 A | 8/1998 | Kuhn et al. ................. 367/135 |
| 5,831,936 A | 11/1998 | Zlotnick et al. ............ 367/124 |
| 6,021,364 A | 2/2000 | Berliner et al. ............... 701/1 |
| 6,046,686 A | 4/2000 | Mitchell et al. ............ 340/936 |
| 6,065,342 A | 5/2000 | Kerr et al. .................... 73/587 |
| 6,072,388 A | 6/2000 | Kyrtsos ..................... 340/439 |
| 6,094,150 A | 7/2000 | Ohnishi et al. ............. 340/943 |
| 6,111,523 A | 8/2000 | Mee .......................... 340/937 |
| 6,201,236 B1 | 3/2001 | Juds ........................... 250/221 |

(Continued)

FOREIGN PATENT DOCUMENTS

DE 44 19 355 A 12/1994

(Continued)

Primary Examiner—Hezron Williams
Assistant Examiner—Rose M. Miller
(74) Attorney, Agent, or Firm—Ogilvy Renault LLP

(57) ABSTRACT

A system for detecting a sound level of vehicles comprising sensor units for detecting vehicles on a road and for measuring a sound level of a detected vehicle. A data processing unit is connected to the sensor units and has an identification recorder for operating the system by recording an identification of the vehicle detected if the sound level is above a given value.

18 Claims, 4 Drawing Sheets

U.S. PATENT DOCUMENTS

| | | |
|---|---|---|
| 6,204,778 B1 | 3/2001 | Bergan et al. ............... 340/905 |
| 6,240,051 B1 | 5/2001 | Bunks ........................ 367/127 |
| 6,686,839 B1 * | 2/2004 | Chou et al. ................. 340/540 |
| 2004/0081322 A1 * | 4/2004 | Schliep et al. ................ 381/57 |

FOREIGN PATENT DOCUMENTS

JP    2002230685 A  *  8/2002

* cited by examiner

| Number | Date | Time | dBA Level |
|---|---|---|---|
| 1 | 01/10/2001 | 1:07 a.m. | 88 |
| 2 | 01/10/2001 | 4:07 a.m. | 85 |
| 3 | 01/10/2001 | 8:07 a.m. | 82 |
| 4 | 01/10/2001 | 8:22 a.m. | 84 |
| 5 | 01/10/2001 | 8:28 a.m. | 92 |
| 6 | 01/10/2001 | 8:42 a.m. | 88 |
| 7 | 01/10/2001 | 10:01 a.m. | 80 |
| 8 | 01/10/2001 | 11:05 a.m. | 85 |
| 9 | 01/10/2001 | 13:28 p.m. | 85 |
|  | 01/10/2001 | :45 p.m. | 84 |

SOUND POLLUTION SURVEILLANCE SYSTEM AND METHOD

CROSS-REFERENCE TO RELATED APPLICATIONS

This application is a national entry of International Patent Application No. PCT/CA02/01228, filed on Aug. 7, 2002, and claims priority on Canadian Patent Application No. 2,357,060, filed on Aug. 10, 2001, and U.S. Provisional Patent Application No. 60/367,267, filed on Mar. 26, 2002.

TECHNICAL FIELD

The present invention generally relates to surveillance of road sound pollution and, more particularly, to a system and a method for monitoring road sound levels to detect and identify infractions.

BACKGROUND ART

It is a well known practice to monitor certain types of sound pollution by sending a surveyor on site equipped with a manual sound-level meter, audiometer, cameras or the like, to gather data relative to the sound environment at the site. Hence, a surveying report may be produced with the manually collected data, having information such as the type of sound emitted and its intensity, video imaging of the source of the sound emission, the date and hour of the sound emission, the geographic location of the site, as well as many other parameters. Although having a surveyor on site is a simple way of detecting sound infractions, this above-described practice is logistically expensive and very inefficient. Surveillance reports seldom cover full days, unless surveyors are on site 24 hours a day, and this is not practical.

Roads often used by freight carriers such as trucks are the site of excessive noise levels. There are plural sources of noise in the freight carriers. For instance, compression braking, deficient maintenance on the trucks, heavy loads and speeding are various causes of excessive noise levels for freight carriers. Excessive noise levels are problematic in some instances. For example, a noisy truck traveling on a road in the vicinity of residential areas disturbs the local residents, especially in late-night or early-morning hours.

Regulations have been set forth to overcome this problem, and these regulations establish the limit between acceptable sound levels and sound-level infractions. In order for these regulations to be applied, infractions need to be reported. The method of having a surveyor on site is not logistically feasible for obvious reasons.

SUMMARY OF INVENTION

Therefore, it is a feature of the present invention to provide an automated road sound pollution surveillance system.

It is a further feature of the present invention to provide a method of use of the road sound pollution surveillance system.

According to the above features of the present invention, from a broad aspect, there is provided a method for detecting sound level of vehicles, comprising the steps of i) monitoring a road to detect movement caused by a vehicle; ii) measuring at least a sound level of a vehicle detected in step i); iii) recording an identification of the vehicle detected if the sound level is above a given value.

According to a further broad aspect of the present invention there is provided a system for detecting sound level of vehicles comprising at least one sensor unit for at least detecting vehicles on a road and measure a sound level of a detected vehicle. A data processing unit is connected to the sensor for operating the system in accordance with the above described method.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
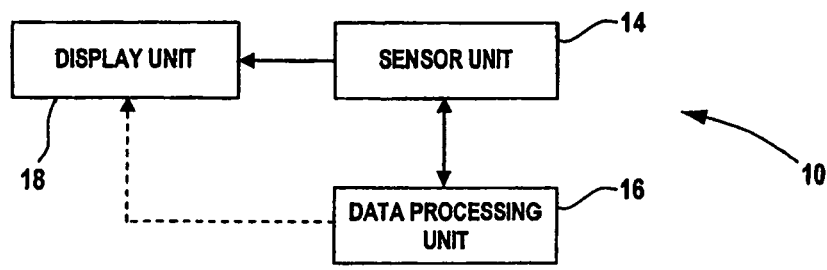
FIG. 1 is a block diagram of a road sound pollution surveillance system in accordance with the present invention.

Referring to the drawings and, more particularly to FIG. 1, a road sound pollution surveillance system in accordance with the present invention is generally shown at 10, and will hereinafter be referred to as the RSP (road sound pollution) surveillance system 10. The RSP surveillance system 10 is generally composed of a sensor unit 14, a data processing unit 16 and a display unit 18. The sensor unit 14 comprises sensors that will measure various parameters in accordance with given uses of the RSP surveillance system 10. The sensor unit 14 is connected to the data processing unit 16 for the transmission of the information it detects and/or measures. Accordingly, relevant information is forwarded from the sensor unit 14 to the data processing unit 16. The data processing unit 16 will store the information and will be accessed by operators through a user interface thereof. The data processing unit 16 may also be a server connected to other computers by Ethernet or Internet to have its database accessed by operators. It is preferred to provide the various components of the RSP surveillance system 10 with batteries, and more advantageously solar rechargeable batteries, especially in areas where power outlets are distant from the site of surveillance.

The display unit 18 is optionally provided in order to display along the roadway the parameters that were measured. For instance, the display unit 18 may be a digital panel sized so as to be seen by a driver of a vehicle being monitored for sound level (in dBA for instance), to signal to the vehicle operator an infraction or to inform the operator of the sound level of his vehicle. The display unit 18 is in communication with the sensor unit 14, and/or the data processing unit 16.

Figure 2:
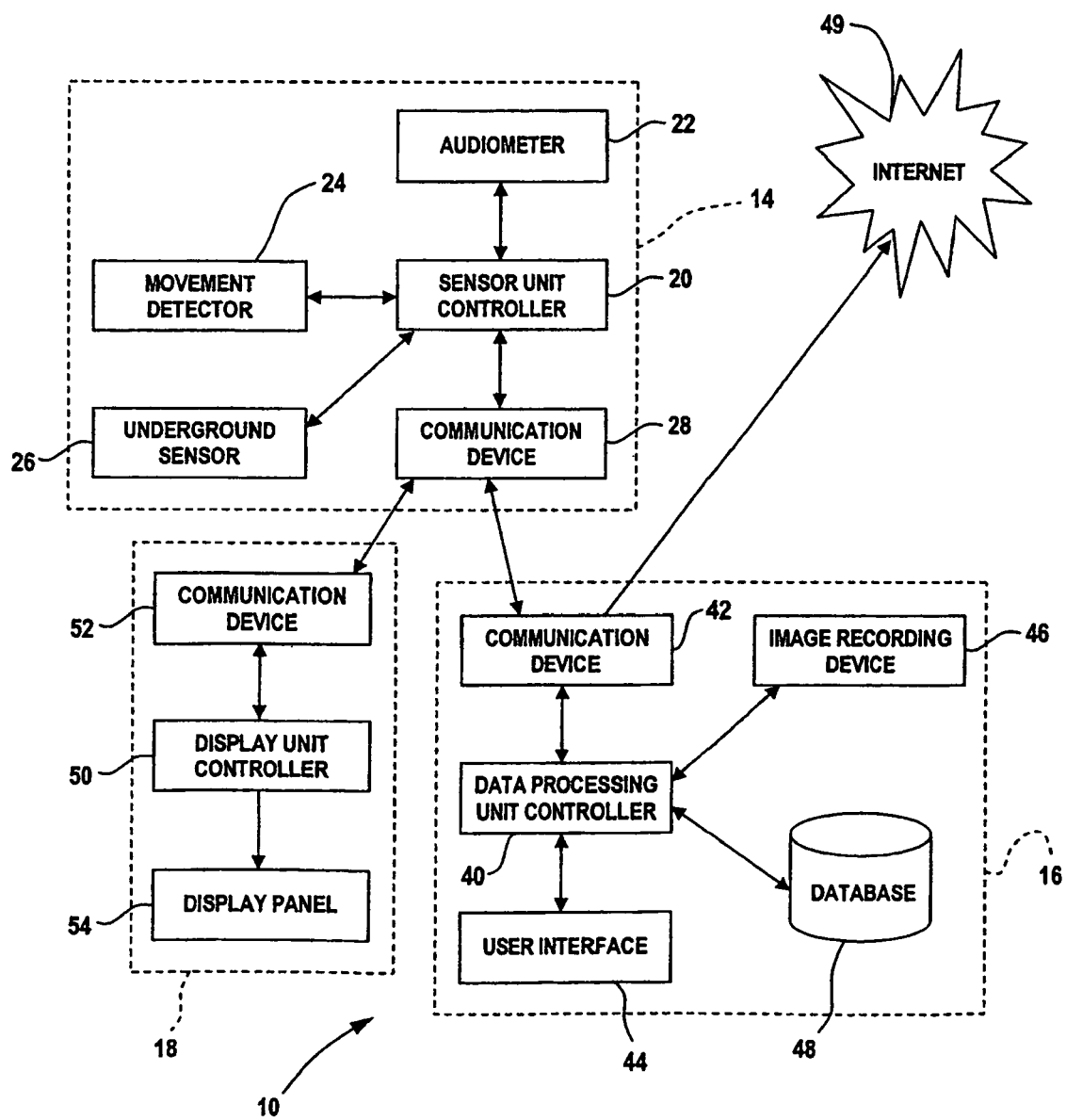
FIG. 2 is a more detailed block diagram of the road sound pollution surveillance system in accordance with a preferred embodiment of the present invention.
Figure 3:
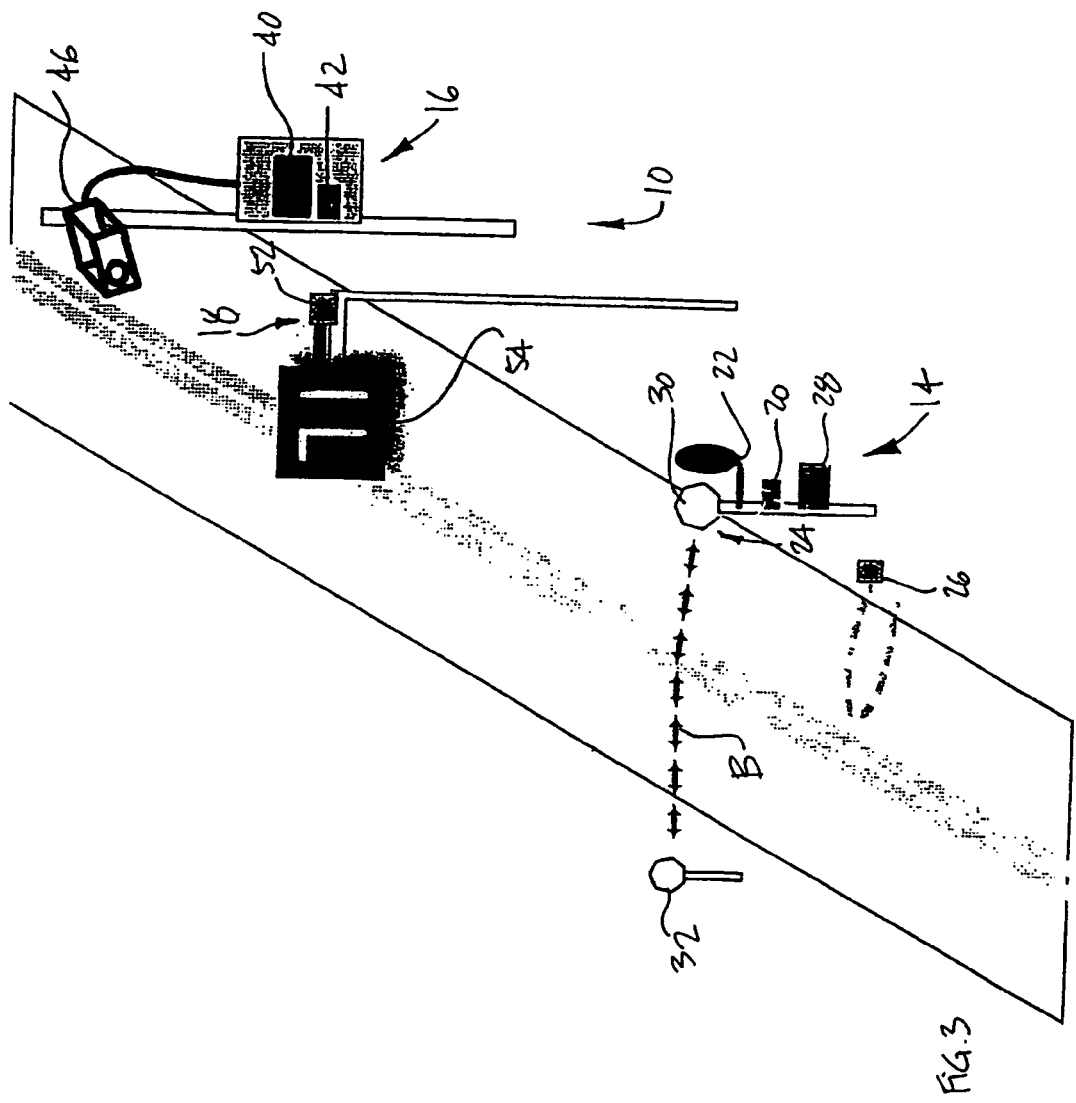
FIG. 3 is a schematic view of the road sound pollution surveillance system assembled in accordance with the present invention.

In a preferred embodiment of the present invention, the RSP surveillance system 10 is used for monitoring roads for sound pollution caused by freight trucks and other vehicles. As mentioned previously, freight trucks are known to be noisy, and the noise level of the freight trucks is generally related to the performance of the truck driver (compression braking, use of Jacobs engine brake, high speeds), the weight of the loads carried by the trucks, or the state of maintenance of the truck. As seen in FIGS. 2 and 3, the sensor unit 14 has multiple sensors to measure and record the various roadside parameters that are related to sound pollution. More precisely, the sensor unit has a sensor unit controller 20 (hereinafter SU controller 20) to which are connected the audiometer 22, the movement detectors 24 and the underground sensors 26. The audiometer 22 is preferably a digital sound-level meter of industrial quality. The sound-level meter is typically lodged in an aluminum tube (e.g., at least two feet long) so as to be directed toward the road to reduce the influence of background noise and so as to be protected from the weather. In other possible embodiments of the present invention, the audiometer 22 is a microphone or a piezoelectric unit connected to an audio-processing software. The audiometer 22 transfers the sound-level measurement to the SU controller 20, typically as an analog DC value. The audiometer 22 may be of the type that constantly monitors the road, whereby the SU controller 20 monitors the readings of the audiometer 22 to detect and record sound-level infractions. The SU controller 20 has an internal clock to provide time data (i.e., time and date) to each sound-level measurement. The SU controller 20 also verifies that all sensors are in a proper operating mode. The SU controller 20 is typically a microcontroller of industrial type, for instance, of the brand ZWorld™.

Movement detectors 24 are provided in order to detect incoming vehicles. This is preferably achieved by active devices such as infrared photocells. For instance, as seen in FIG. 3, an emitter photocell 30 emits an infrared beam B to a receiver photocell 32 across a road. The infrared photocells preferably used can have the emitter and receiver thereof positioned up to 200 feet away from one another. When the infrared beam is disrupted, movement is detected. In order for the movement detectors 24 to detect freight trucks, the photocells 30 and 32 can be mounted on posts to be positioned at given heights at which they do not detect pedestrians or small vehicles, such as cars and bikes. For instance, a height of eight feet is appropriate. Although this is not shown, the movement detectors 24 may optionally be used for detecting the direction of a freight truck. This may be achieved by having two emitter photocells 30 and corresponding receiver photocells 32. An infrared beam between a first pair of emitter photocell 30 and receiver photocell 32 being disrupted will enable the SU controller 20 to determine the direction of the freight truck. The two pairs of emitter photocell 30 and receiver photocell 32 may also be used for selecting only vehicles of certain lengths. By positioning the receiver photocells 32 at a given distance (e.g., four feet) from one another, the SU controller 20 may be programmed to detect vehicles that disrupt both the infrared beams at a same time. Accordingly, a vehicle will need to be at least four feet long to disrupt both the infrared beams at a same time. This feature ensures that undesired disruptions of the infrared beam will be interpreted as incoming vehicles. The photocells 30 and 32 may also be used to estimate the speed of the vehicle. As the SU controller 20 incorporates a clock, comparison of time data between the disrupting of two beams can be used to evaluate speed. Alternative devices for the movement detectors 24 are in-ground vibration or weight detectors positioned strategically, video surveillance cameras, and laser optical readers. Such laser optical readers can be used with bar coding on the vehicles so as to identify the latter rapidly.

Still referring to FIG. 3, the underground sensors 26 are for measuring the weight of the vehicles on the road. The underground sensors 26 are preferably positioned where the vehicles come to a stop, such as stop signs, where an image recording device could also be used for surveying. As best shown in FIG. 2, the SU controller 20 interconnects the various sensors of the sensor unit 14 described above and ensures the interaction therebetween, as will be explained in detail hereinafter.

The sensor unit 14 is connected to the data processing unit 16 via a communication device 28 connected to the SU controller 20. In a preferred embodiment of the present invention, the communication device 28 is a radio modem such that the sensor unit 14 and the data processing unit 16 are in wireless communication. In instances where plural sensor units 14 are provided for one data processing unit 16, the use of radio modems each having an own communication protocol with a radio modem of the data processing unit 16 is desired for multipoint communication. It is obvious that the sensor units 14, the data processing unit 16 and the display unit 18 may all be interconnected by wires. This represents a cost-effective solution provided that the distance between units is relatively small.

Still referring to FIG. 2, the data processing unit 16 is shown having a data processing unit controller 40 (hereinafter DPU controller 40), a communication device 42, a user interface 44, an image recording device 46, and a database 48, incorporated in the DPU controller 40. The data processing unit 16 communicates with the sensor unit 14 via the communication device 42. The communication device 42 of the data processing unit 16 can have a radio modem and a PSTN modem, the former being used for radio communications with the sensor unit 14, and the latter being used for the connection of the data processing unit 16 to other computers or internet (as shown at 49), for instance, when the data processing unit 16 is a server for these other computers. The communication device 42, the user interface 44, and the image recording device 46 are all connected to the DPU controller 40.

Figures 5, 6:
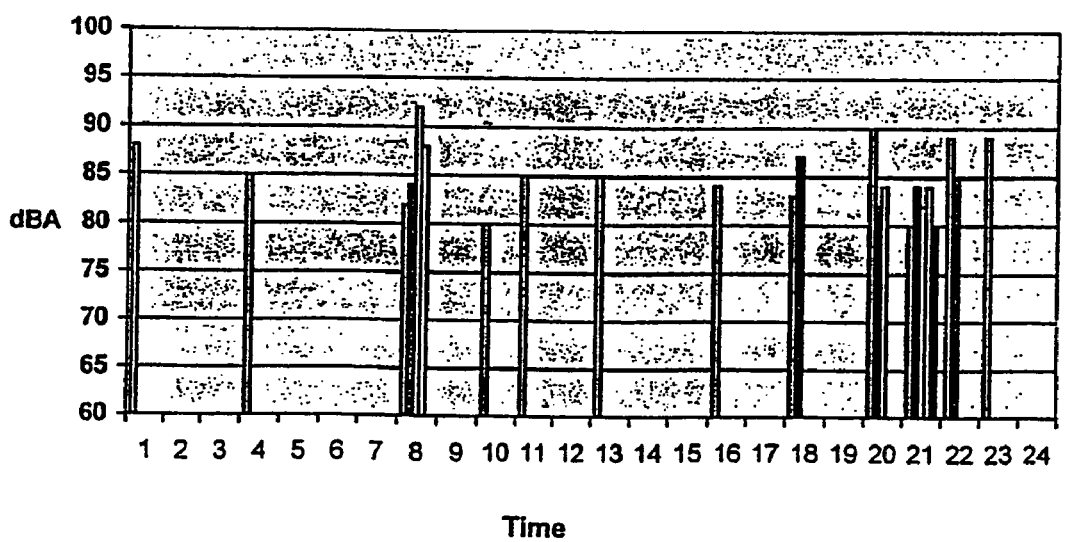
FIG. 5 is a table illustrating a report obtained from the road sound pollution surveillance system in accordance with the present invention.
FIG. 6 is a graph illustrating statistical data obtained from the road sound pollution surveillance system in accordance with the present invention.

The DPU controller 40, as will be described in further detail hereinafter, has a video board and controls the image recording device 46 so as to film or take pictures of the vehicles on the road. More precisely, the DPU controller 40 commands the image recording device 46 as a result of a signal of an infraction sent by the DPU controller 40. It is preferred to have a digital image recording device 46 in the RSP surveillance system 10, for instance, provided with a night-vision system if it is to take measurement at night. The digital image recording device 46 is preferably connected to the DPU controller 40. An alternative way of identifying the vehicles is to provide each of the vehicles with an emitter device, with a specific frequency to each emitter device. The sensor unit 14 is equipped with a receiver device to receive the signal from the emitter and identify the vehicle as a function of the frequency of the signal. The SU controller 20 could be adapted to relate the signal to specific vehicle. The user interface 22 is provided in order for an operator to adjust the data processing unit 16 on site. For instance, periodic maintenance, the resetting of the threshold regulation values following regulation changes, or simply typical maintenance, is achieved through the user interface 44. Data received from the SU controller 20 of the sensor unit 14 is stored in the database 48 by the DPU controller 40. The data processing unit 16 is adapted for performing reports with data collected by the sensor unit 14. For instance, the reports may include tables and graphs containing information about the infractions, including sound-level measurements, precise time of the infraction, picture or video of the license plate of the faulty vehicle, as well as other optional information such as the frequency of the noise, the weight and speed of the faulty vehicle. The data processing unit 16 can also provide statistical reports, in the form of graphs, for instance, that can exhibit the number of infractions per hour. It is possible to program the DPU controller 40 to e-mail periodically the infractions detected. FIGS. 5 and 6 show typical examples of such tables and graphs. Reports can then be sent to appropriate sources for corrective action.

The display unit 18 has a display unit controller 50 (hereinafter DU controller 50), a communication device 52, and a display panel 54. The communication device 52 and the display panel 54 are wired to the DU controller 50. The display unit 18 communicates with the SU controller 20 of the sensor unit 14 via the transmission device 52, which is once more preferably a radio modem. The sensor unit 14 may be programmed in order to send only relevant information to the DU controller 50 of the display unit 18. For instance, the DPU controller 20 of the control unit 12 may command the DU controller 50 of the display unit 18 to indicate on the display panel 54 sound level measurements that are above threshold values. The display unit 18 may also be constantly displaying all sound-level measurements. As seen in FIG. 3, the display panel 54 is positioned so as to be visible to the drivers of the freight trucks. It can also be made to flash to draw attention. The DU controller 50 is incorporated in the display panel 54. Accordingly, drivers will know that they have committed a sound-level infraction when the sound level is displayed on the display panel 54. The display panel 54 typically displays the sound level for six to seven seconds, or sufficient time to ensure that the indicated values are seen by the truck driver.

Figure 4:
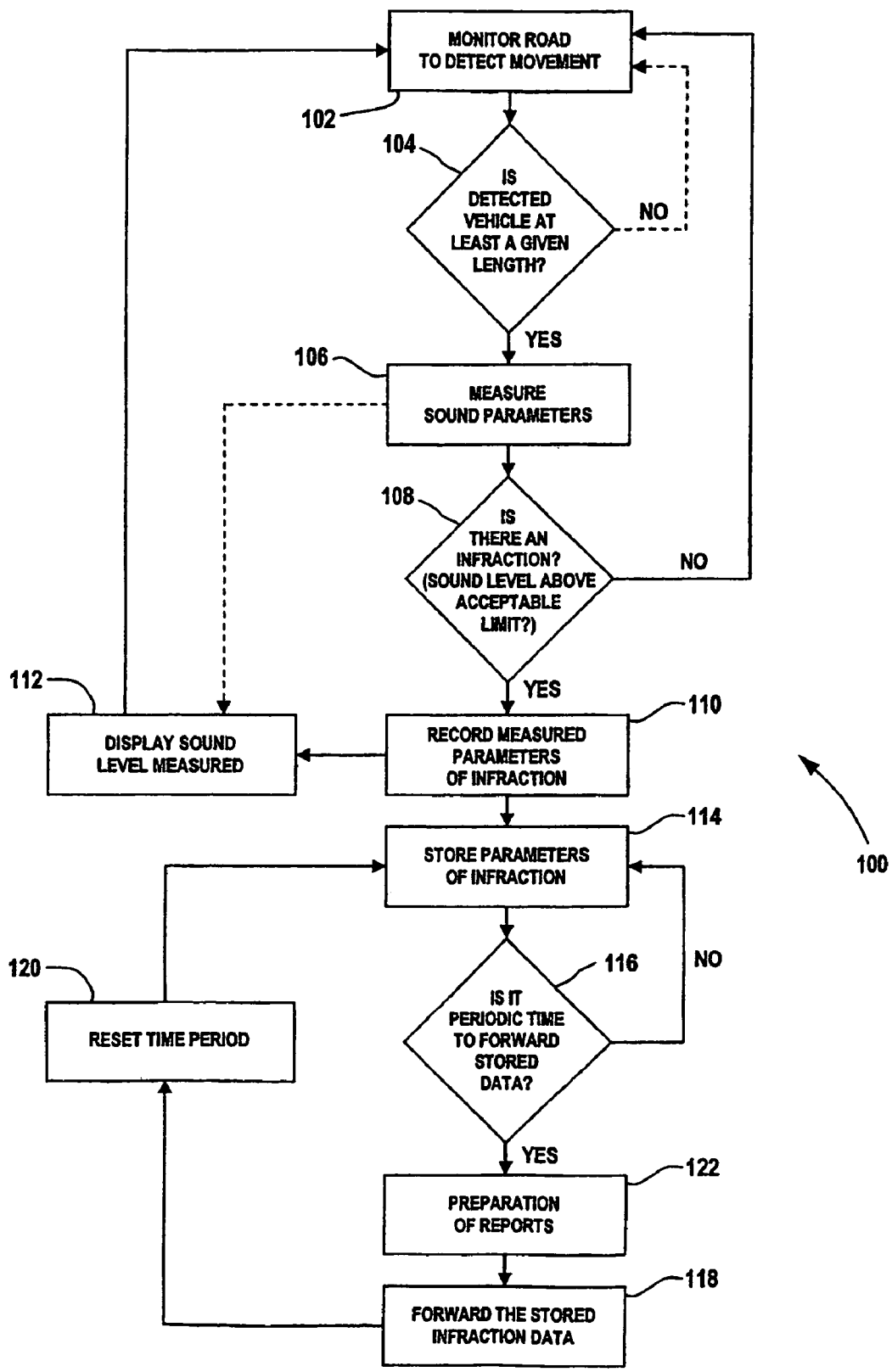
FIG. 4 is a flowchart of a method of operating the road sound pollution surveillance system.

Referring now to FIG. 4, an operation of the RSP surveillance system 10 is described in detail and is generally shown at 100. According to Step 102, the road is monitored for movement. As explained hereinabove, this is achieved by the movement detectors 24 of the sensor unit 14. As shown at 104, an optional condition that the detected vehicle is longer than a given length can be set. This is achieved by having pairs of emitter/receiver as movement detectors 24, as described previously. It is pointed out that the detection of movement in Step 102 includes the detection of the direction of movement if the RSP surveillance system 10 has pairs of emitter/receiver.

Whether it is directly after Step 102, or after Condition 104, the sound level is measured at Step 106 by the audiometer 22 of the sensor unit 14. In Condition 108, the SU controller 20 of the sensor unit 14 detects whether there is an infraction. As mentioned above, the measurements are sent from the audiometer 22 to the SU controller 20, which has the tolerable sound levels programmed therein. If the highest sound level measurement is above the accepted limit (i.e., the tolerable sound level), then an infraction is signaled.

According to Step 110, the parameters of the infraction are recorded by the data processing unit 16. The parameters include the sound level measured, the image record such that a license plate of a faulty vehicle can be taken, the identification of the vehicle as a function of a signal from an emitter thereof, the time and date of the infraction, as well as other optional information, such as the weight of the vehicle, the frequency of the sound, the direction of the vehicle. According to Step 112, the sound level of the infraction is displayed on the display panel 54 so as to be seen by the driver having committed the infraction. It is pointed out that Step 112 may be performed directly after Step 106 of measuring the sound parameters, such that any sound level measured for a vehicle is displayed on the display unit 18, notwithstanding the threshold level. According to Step 114, the parameters measured in Step 110 are stored in the database 48 of the data processing unit 16.

Periodically (e.g., every 24 hours), as set forth by Condition 116 and Step 118, the infractions recorded and stored in the database 48 may be forwarded to a central computer. In Step 122, reports are automatically prepared, including statistical graphs and infraction reports. It is pointed out that Step 122 is optional. It is performed prior to Step 118, as the reports are produced by the data processing unit 16. However, the raw information can be sent to the central computer, wherein the reports will be prepared. Once the stored infraction data has been forwarded to a central computer, the time period is reset, as shown in Step 120, for another period to be started for the forwarding of the recorded and stored infraction data. On the other hand, the infractions recorded and stored may be forwarded every time the database 48 is full. For instance, a database typically has 2 megs of space.

The road is monitored until movement is detected. If movement is detected, the RSP surveillance system 10 will have its audiometer 22 measure the parameters of the sound emitted, such as the intensity and frequency. In Step 104, the highest value of the sound level will be recorded by the SU controller 20 of the RSP surveillance system 10. If the noise measured is below the acceptable limit, the SU controller 20 will simply have the RSP surveillance system return to the monitoring of the road for movement in Step 100. If the noise level measured in Step 104 is above the acceptable limit, the control unit 12 will have the RSP surveillance system 10 go to Step 106, wherein the image recording device 46 will gather video information about the vehicle having committed an infraction.

Although the RSP surveillance system 10 mounted roadside as illustrated in FIG. 3 only has one sensor unit 14, plural sensor units 14 may be installed in series on a road, in order to monitor long segments of road in one direction. In such a case, the sound-level measurement may be forwarded from one sensor unit 14 to another up to the processing unit 16, or the data processing unit 16 may accept all readings from the sensor units 14, to record the highest measured sound level. In the first case, wherein the information is forwarded from sensor unit 14 to another in a modular fashion, the information recorded can be validated between units 14. Accordingly, a freight truck can be monitored on a longer distance than with only one sensor unit 14. It is obvious that not every station of sensor unit 14 is required to have movement detectors 24. A single movement detector 14 may be installed upstream of the sensor units 14. If long segments of road are to be monitored in both directions, the RSP surveillance system 10 may be provided with image recording devices 46 at opposed ends of the series of sensor units 14. Also, in such a case, display units 18 may also be provided at opposed ends of the series of sensor units 14. In another case, two intersecting roads may each be monitored by a same RSP surveillance system 10, with the data processing unit 16 and the display unit 18 being positioned at the intersection between the roads such that the image recording device 46 and the display panel 54 can be used for both roads. It has been thought to install the RSP surveillance system 10 on hill sections of roads, as compression braking is frequently used to slow down a freight truck moving downhill.

In instances where plural sensor units 14 are provided in series to have plural sound-level measurements taken, it is preferable to have the internal clocks in each of the SU controllers 20 synchronized, such that the time data of each sound-level measurement taken by a sensor unit 14 concurs with the corresponding sound-level measurement of the other sensor units 14. The DPU controller 40 can ensure that the sensor units 14 are synchronized. Each of the sensor units 14 can be paired up with a display unit 16, such that the noise level is displayed at each detection station.

It is within the ambit of the present invention to cover any obvious modifications of the embodiments described herein, provided such modifications fall within the scope of the appended claims.

What is claimed is:

1. A method for detecting sound level of vehicles, comprising the steps of:
   i) monitoring a road to detect movement caused by a vehicle;
   ii) measuring at least a sound level of a vehicle detected in step i);
   iii) determining if the measured sound level is above a given value and indicating an infraction;
   iv) recording an identification of the vehicle indicated as one of said infraction;
   v) detecting the time at which the vehicle is detected; and
   vi) forwarding recorded infraction information to a central unit for storage therein, for subsequent access to said recorded information.

2. The method according to claim 1, wherein the step i) includes detecting a direction of the vehicle.

3. The method according to claim 2, wherein the step i) includes detecting a speed of the vehicle.

4. The method according to claim 1, wherein the step iii) includes measuring a weight of the vehicle.

5. The method according to claim 1, wherein the access to said recorded information comprises displaying the measured sound level on site.

6. The method according to claim 1, comprising a step of displaying the measured sound level on site if the measured sound level is above the given value.

7. The method according to claim 1, wherein said identification of the vehicle is at least one of an image and a signal emitted by the vehicle.

8. A system for detecting a sound level of vehicles comprising:
   at least one sensor unit for at least detecting vehicles on a road and measure a sound level of a detected vehicle, the at least one sensor unit having an emitter/receiver device with at least one disruptable light beam to detect vehicles; and
   a data processing unit connected to the sensor unit and having an identification recorder for operating the system by:
   i) monitoring a road to detect movement caused by a vehicle;
   ii) measuring at least a sound level of a vehicle detected in step i);
   iii) recording an identification of the vehicle detected if the sound level is above a given value.

9. The system according to claim 8, further comprising at least one display unit connected to the data processing unit, for displaying the measured sound level.

10. The system according to claim 9, wherein the at least one sensor unit, the data processing unit, and the at least one display unit are connected by wireless communications.

11. The system according to claim 8, wherein the emitter/receiver device has two disruptable light beams, the light beams being spaced by a given distance so as to selectively detect movement of objects of given lengths.

12. The system according to claim 11, wherein an order of disruption of the two light beams is used to identify a direction of the vehicle and to calculate a speed of the vehicle.

13. The system according to claim 8, wherein the at least one sensor unit has a sonometer to measure the sound level.

14. The system according to claim 8, comprising a series of said at least one sensor unit positioned along a road, with information recorded by an upstream one of the series of said sensor unit being validated by subsequent ones of said sensor unit.

15. The system according to claim 8, wherein the data processing unit is positioned with respect to a road such that the identification recorder thereof has a working range coinciding with a portion of the road wherein vehicles must come to a stop.

16. The system according to claim 8, wherein the identification recorder is one of an image recorder a frequency signal recorder receiving signals from an emitter device on the vehicle.

17. A system for detecting a sound level of vehicles comprising:
   at least one sensor unit for at least detecting vehicles on a road and measure a sound level of a detected vehicle;
   a data processing unit connected to the sensor unit and having an identification recorder for operating the system by:
   i) monitoring a road to detect movement caused by a vehicle;
   ii) measuring at least a sound level of a vehicle detected in step i);
   iii) recording an identification of the vehicle detected if the sound level is above a given value;
   a series of the at least one sensor unit positioned along a road, with information recorded by an upstream one of the series of said sensor unit being validated by subsequent ones of said sensor unit.

18. A system for detecting a sound level of vehicles comprising:
   at least one sensor unit for at least detecting vehicles on a road and measure a sound level of a detected vehicle; and
   a data processing unit connected to the sensor unit and having an identification recorder for operating the system by:
   i) monitoring a road to detect movement caused by a vehicle;
   ii) measuring at least a sound level of a vehicle detected in step i);
   iii) recording an identification of the vehicle detected if the sound level is above a given value;
   the data processing unit being positioned with respect to a road such that the identification recorder thereof has a working range coinciding with a portion of the road wherein vehicles must come to a stop.

* * * * *